(12) United States Patent
Sramek et al.

(10) Patent No.: US 9,944,257 B1
(45) Date of Patent: Apr. 17, 2018

(54) WASHING SYSTEM TO CLEAN A SURFACE WITH ENHANCED EFFICIENCY

(71) Applicants: John J Sramek, Oxnard, CA (US); Steve Sramek, Long Beach, CA (US)

(72) Inventors: John J Sramek, Oxnard, CA (US); Steve Sramek, Long Beach, CA (US)

(*) Notice: Subject to any disclaimer, the term of this patent is extended or adjusted under 35 U.S.C. 154(b) by 275 days.

(21) Appl. No.: 14/990,687

(22) Filed: Jan. 7, 2016

Related U.S. Application Data

(60) Provisional application No. 62/145,108, filed on Apr. 9, 2015.

(51) Int. Cl.
| | | |
|---|---|---|
| *A47L 13/58* | (2006.01) | |
| *B60S 3/04* | (2006.01) | |
| *B08B 13/00* | (2006.01) | |
| *A47L 13/60* | (2006.01) | |
| *A47L 13/16* | (2006.01) | |

(52) U.S. Cl.
CPC ............. *B60S 3/045* (2013.01); *B08B 13/00* (2013.01); *A47L 13/16* (2013.01); *A47L 13/58* (2013.01); *A47L 13/60* (2013.01)

(58) Field of Classification Search
CPC .......... A47L 13/50; A47L 13/58; A47L 13/60; B60S 3/045
See application file for complete search history.

(56) References Cited

U.S. PATENT DOCUMENTS

| | | | | |
|---|---|---|---|---|
| 1,572,102 A | * | 2/1926 | Braunsdorf | A47L 13/58 15/142 |
| 2,255,091 A | * | 9/1941 | Vaughn | A47L 13/58 15/260 |
| 2,664,584 A | * | 1/1954 | Twerdahl | A47L 13/58 15/260 |
| 2,671,239 A | * | 3/1954 | Wisner | A47L 13/58 134/156 |
| 3,920,144 A | * | 11/1975 | Callen | B65D 25/02 220/533 |
| 8,863,350 B2 | * | 10/2014 | Van Landingham, Jr. | A47L 13/51 15/264 |
| 9,474,429 B2 | * | 10/2016 | Kepner | A47L 13/58 |
| 9,668,633 B1 | * | 6/2017 | Cervantes | A47L 13/60 |
| 2004/0187248 A1 | * | 9/2004 | Libman | A47J 47/18 15/260 |

* cited by examiner

*Primary Examiner* — Michael Jennings
(74) *Attorney, Agent, or Firm* — Plager Schack LLP

(57) ABSTRACT

A washing system to clean a surface with enhanced efficiency and reduced water usage includes a housing member having a first cleaning fluid compartment and a second rinsing fluid compartment separated by a dividing wall, a pair of rollers rotatably mounted to the housing member, and a sponge assembly having a first sponge and a second sponge. The sponge assembly contacts the housing member to permit the first sponge to soak the cleaning fluid in the first compartment and the second sponge to soak the rinsing fluid in the second compartment simultaneously. The sponge assembly is maneuvered to simultaneously permit the first sponge to contact the first roller and dividing wall to remove excess cleaning fluid stored therein and the second sponge to contact the second roller and dividing wall to remove excess rinsing fluid stored therein.

10 Claims, 4 Drawing Sheets

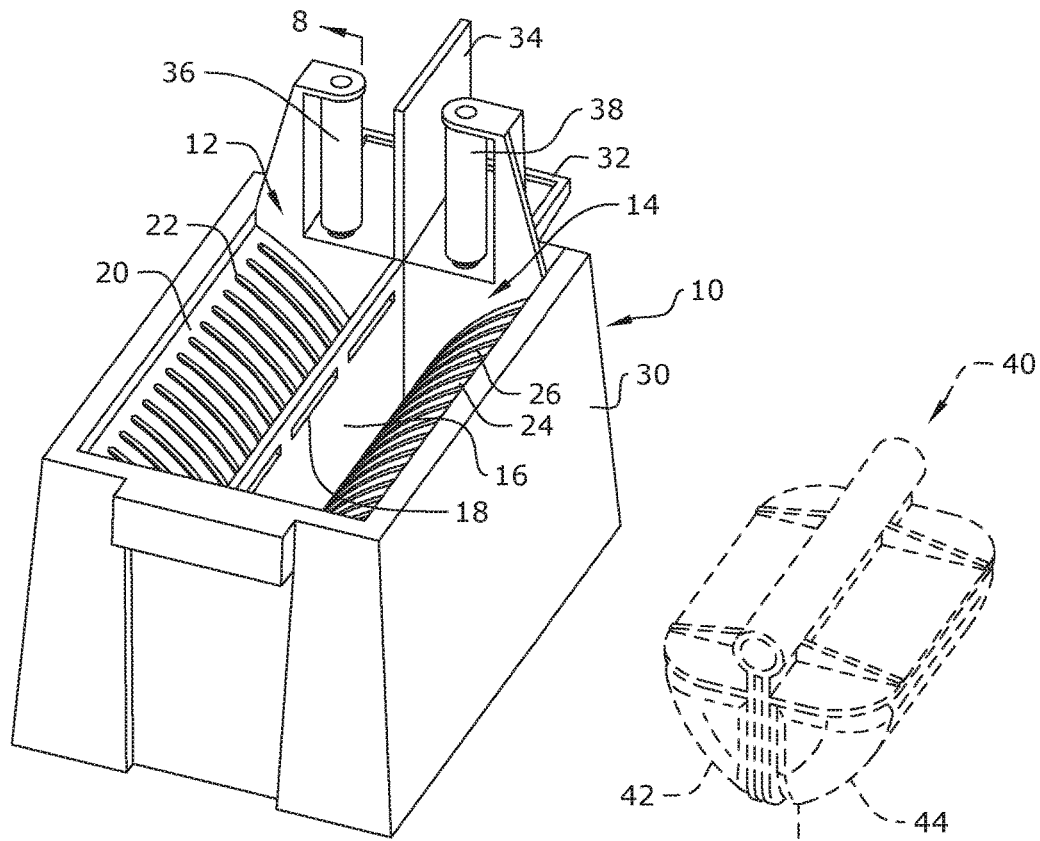
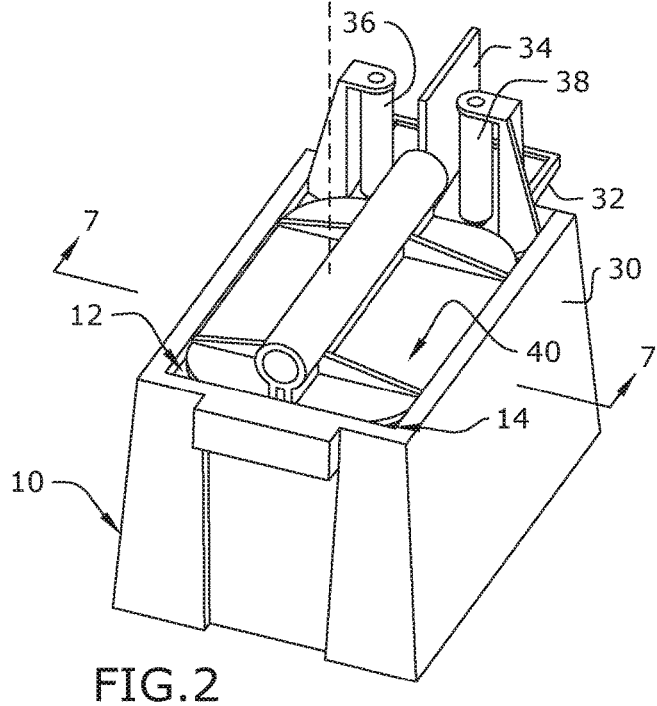

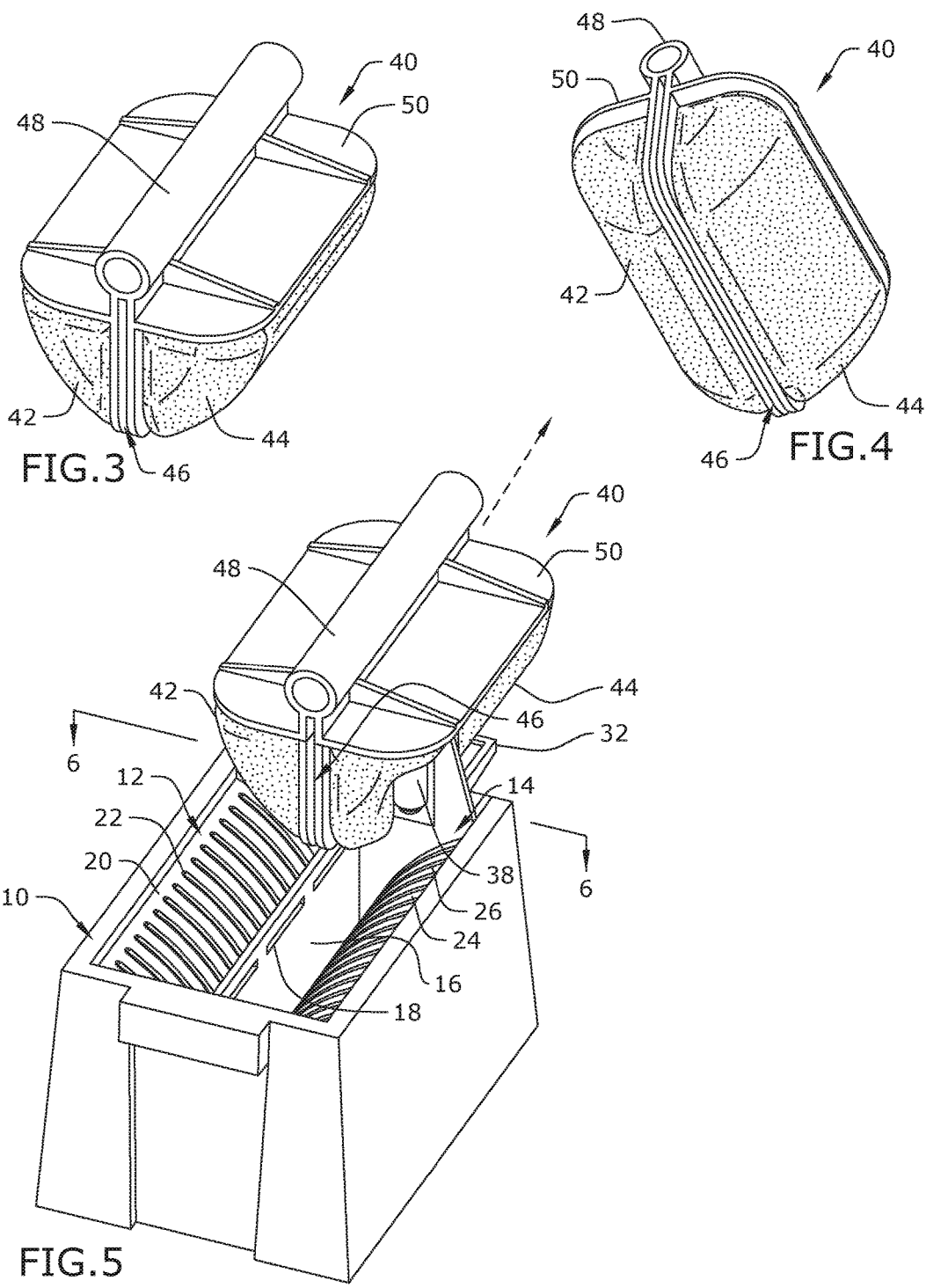

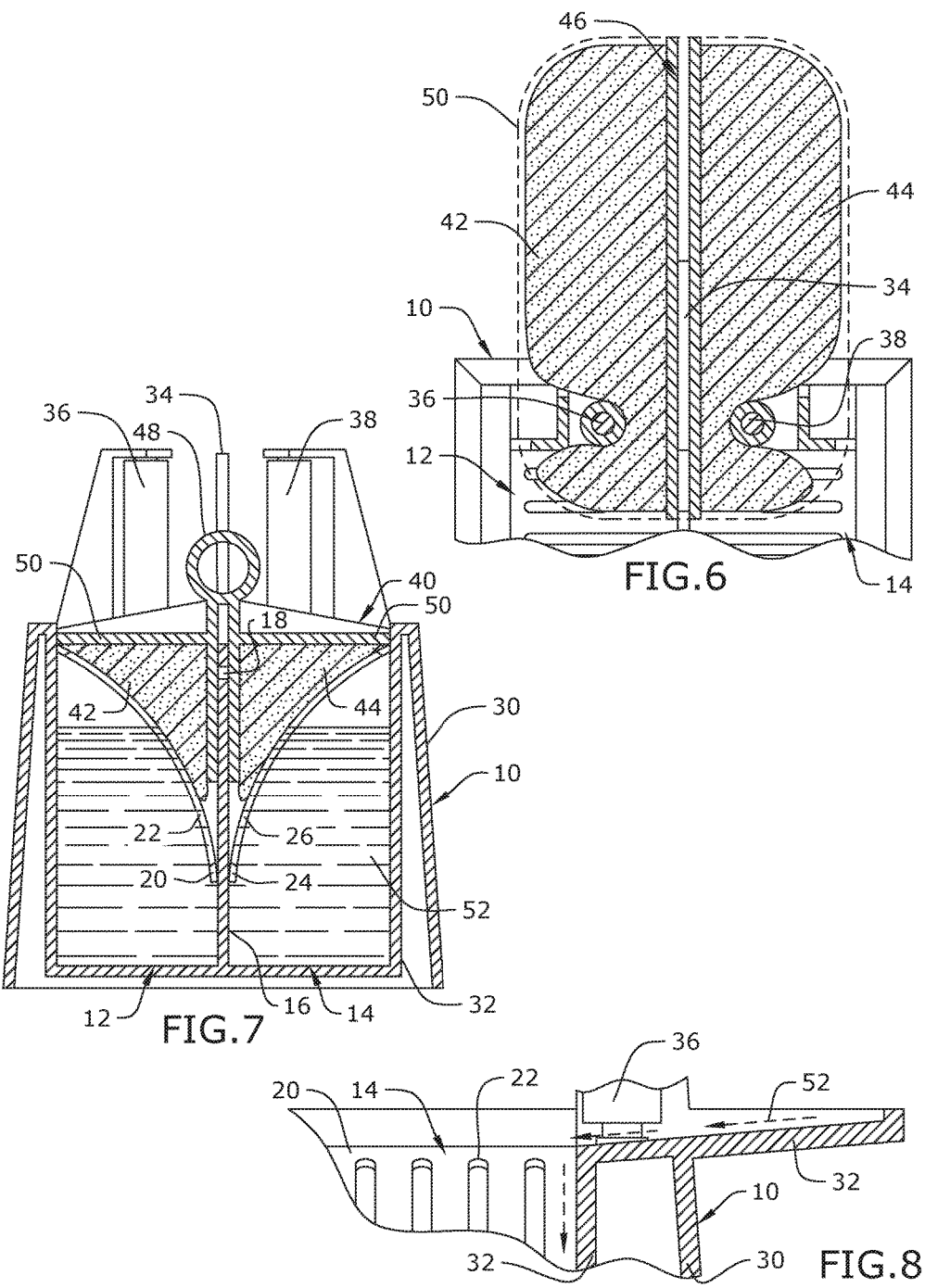

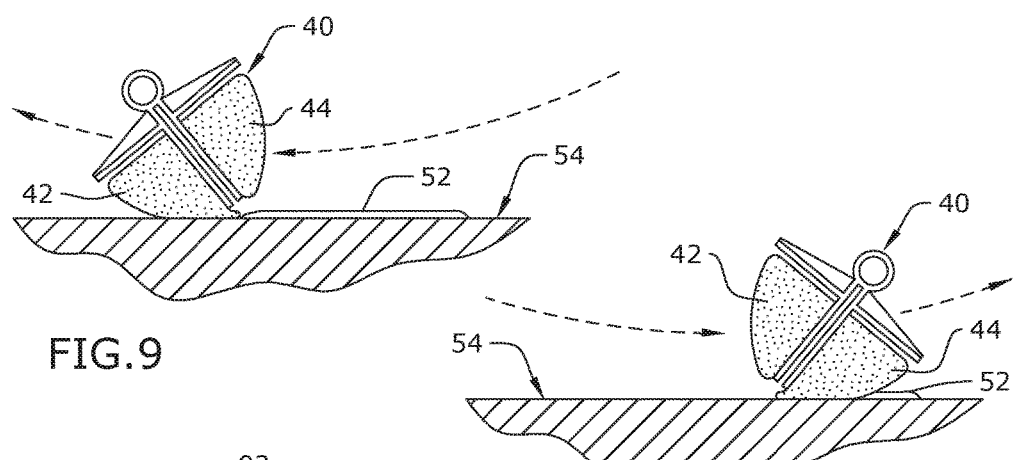
FIG.9
FIG.10
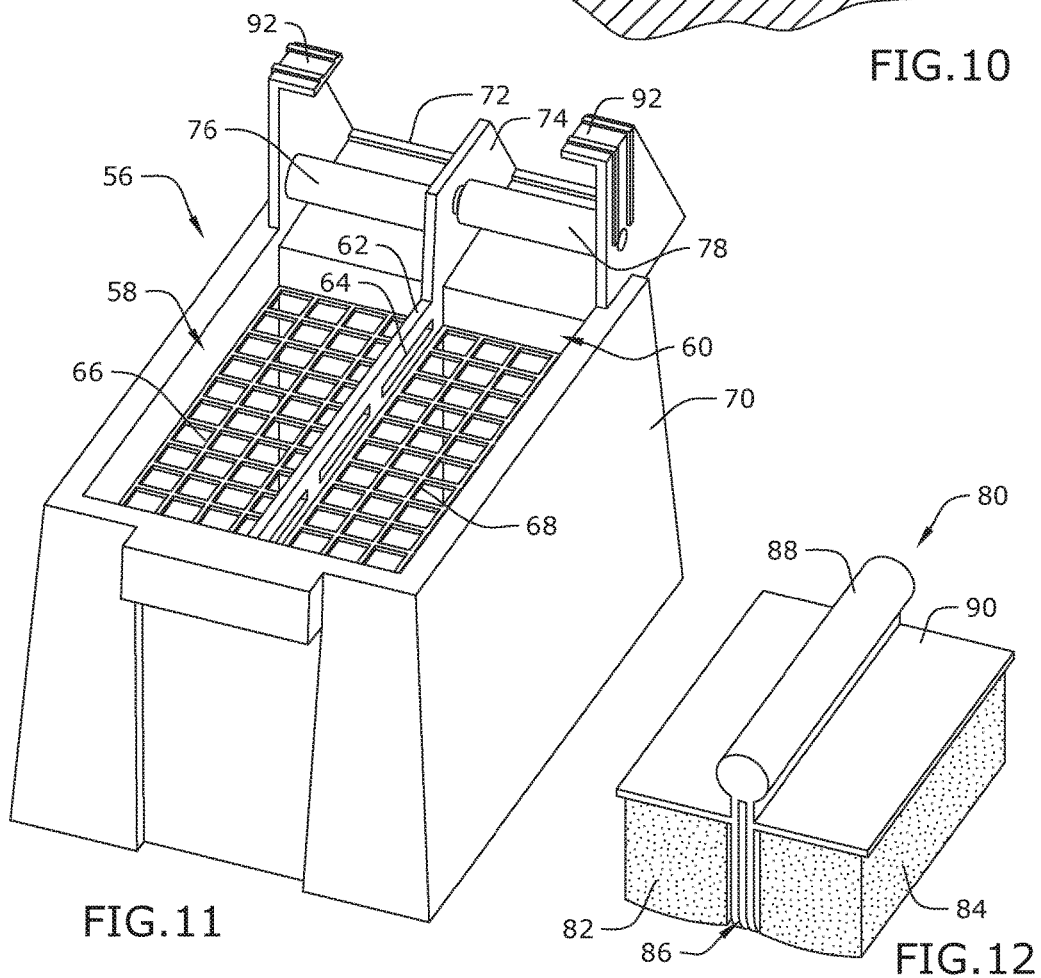
FIG.11
FIG.12

WASHING SYSTEM TO CLEAN A SURFACE WITH ENHANCED EFFICIENCY

RELATED APPLICATION

The application claims priority to provisional patent application U.S. Ser. No. 62/145,108 filed on Apr. 9, 2015, the entire contents of which is herein incorporated by reference.

BACKGROUND

The embodiments herein relate generally to cleaning apparatuses and/or systems for washing cars, vehicles or other surfaces.

Washing a car, vehicle, or other surface with a garden hose uses a large amount of water, between 80 and MO gallons. This results in a significant amount of wasted water because the hose continues to spray water during its operation, some of which travels past the car and onto the ground. This process is also limited because users do not always have access to a water line for the hose when cleaning the vehicle or surface.

Several existing containers exist to store a detergent fluid and/or rinsing fluid as disclosed in U.S. Pat. Nos. 2,671,239 and 2,255,091. These containers comprise one or more compartments designed to store a cleaning fluid and a screen or perforated plate secured to the container. This permits a user to press a mop against the screen or perforated plate to squeeze excess fluid and/or dirt from the mop to the container. However, these containers are limited because squeezing the mop against the screen does not always remove the desired amount of fluid. In addition, squeezing the excess fluid stored in the mop is difficult and/or inefficient because the fluid level in the container is situated above a portion of the screen or perforated plate.

As such, there is a need in the industry for a washing system that overcomes the limitations of the prior art, which effectively cleans a surface with enhanced efficiency and reduced water usage. Specifically, there is a need for a washing system with a secondary fluid removal mechanism that permits a sponge assembly to remove excess fluid stored therein with ease.

SUMMARY

A washing system for use with a tool to clean a surface with enhanced efficiency and reduced water usage is provided. The tool is configured to apply a cleaning fluid and a rinsing fluid to the surface. The washing system comprises a housing member comprising a first compartment and a second compartment separated by a dividing wall, the first compartment configured to store the cleaning fluid and the second compartment configured to store the rinsing fluid, a pair of rollers rotatably mounted to the housing member and positioned proximate the first and second compartments, and a sponge assembly detachably coupled to the housing member and comprising a first sponge and a second sponge, wherein the sponge assembly is configured to contact the housing member to permit the first sponge to soak the cleaning fluid in the first compartment and the second sponge to soak the rinsing fluid in the second compartment simultaneously, wherein the sponge assembly is maneuvered to simultaneously permit the first sponge to contact the first roller and dividing wall to remove excess cleaning fluid stored therein and the second sponge to contact the second roller and dividing wall to remove excess rinsing fluid stored therein.

BRIEF DESCRIPTION OF THE FIGURES

The detailed description of some embodiments of the invention will be made below with reference to the accompanying figures, wherein the figures disclose one or more embodiments of the present invention.

FIG. 1 depicts a perspective view of certain embodiments of the washing system;

FIG. 2 depicts an exploded view of certain embodiments of the washing system;

FIG. 3 depicts a top perspective view of certain embodiments of the washing system illustrating sponge assembly 40;

FIG. 4 depicts a bottom perspective view of certain embodiments of the washing system illustrating sponge assembly 40;

FIG. 5 depicts a perspective view of certain embodiments of the washing system shown in use;

FIG. 6 depicts a section view of certain embodiments of the washing system taken along line 6-6 in FIG. 5.

FIG. 7 depicts a section view of certain embodiments of the washing system taken along line 7-7 in FIG. 2;

FIG. 8 depicts a section view of certain embodiments of the washing system taken along line 8-8 in FIG. 1;

FIG. 9 depicts a section view of certain embodiments of the washing system illustrating sponge assembly 40 in use;

FIG. 10 depicts a section view of certain embodiments of the washing system illustrating sponge assembly 40 in use;

FIG. 11 depicts a perspective view of an alternative embodiment of the washing system; and FIG. 12 depicts a perspective of an alternative embodiment of the washing system illustrating alternate sponge assembly 80.

DETAILED DESCRIPTION OF CERTAIN EMBODIMENTS

As depicted in FIGS. 1-2, washing system 10 is configured for use with sponge assembly 40 to clean a surface such as a car or other vehicle (not shown). Washing system 10 is configured to store fluid 52 as depicted in FIG. 7, which preferably includes a cleaning fluid and a rinsing fluid. Sponge assembly 40 is configured to soak the cleaning fluid and rinsing fluid. Washing system 10 is configured to squeeze excess fluid stored within sponge assembly 40 prior to being used to clean the desired surface.

Washing system 10 generally comprises a housing 30 comprising first compartment 12, second compartment 14, dividing wall 16, first compartment panel 20, second compartment panel 24, first vertical roller 36, second vertical roller 38, return tray 32 and tray divider wall 34. First and second compartments 12, 14 are configured to store fluid 52 as depicted in FIG. 7. In a preferred embodiment, fluid 52 comprises a cleaning fluid disposed within first compartment 12 and a rinsing fluid such as clean water disposed within second compartment 14. Dividing wall 16 comprises dividing wall slots 18 to permit fluid 52 to pass through to prevent any compartment from overflowing. It shall be appreciated that the cleaning fluid may contain any type of detergent or alternative cleaning agent known in the field.

First and second compartments 12, 14 are positioned side by side and separated by dividing wall 16. First and second compartment panels 20, 24 are disposed within first and second compartments 12, 14. First and second compartment panels 20, 24 comprise first compartment panel slots 22 and second compartment panel slots 26, which permit fluid 52 to pass through. Each compartment panel comprises a curvature and is configured to contact sponge assembly 40 when disposed therein.

First vertical roller 36 and second vertical roller 38 are preferably made from rubber and are rotatably mounted to the housing proximate first and second compartments 12, 14. First and second vertical rollers 36, 38 are positioned above return tray 32 and are separated by tray divider wall 34. In a preferred embodiment, first vertical roller 36 is positioned a greater distance away from tray divider wall 34 compared to the distance between second vertical roller 38 and tray divider wall 34. In one embodiment, the distance between the centerline of first vertical roller 36 and tray divider wall 34 is approximately 1⅝". The distance between the centerline of second vertical roller 38 and tray divider wall 34 is approximately 1⅜". However, the distances between vertical rollers 36, 38 and tray divider wall 34 may vary.

As depicted in FIGS. 3-4, sponge assembly 40 comprises handle 48, upper flange 50, first sponge 42, second sponge 44 and center slot 46. Handle 48 and upper flange 50 form two generally L-shaped members separated by center slot 46. First and second sponges 42, 44 may be secured to the L-shaped members by any fasteners or adhesive known in the field. First and second sponges 42, 44 may be any type of sponge known in the field. In one embodiment, first sponge 42 has a greater fluid and storage capability, and ability to pick up dirt and debris from the surface to be cleaned, while the second sponge 44 has a greater capability for absorbing cleaning fluid from the surface.

In operation, washing system 10 is prepared by disposing fluid 52 therein, which comprises a cleaning fluid disposed within first compartment 12 and a rinsing fluid such as clean water disposed within second compartment 14. Generally, the level of fluid 52 is partially above first and second compartment panels 20, 24. As depicted in FIGS. 2 and 7, sponge assembly 40 is disposed within storage apparatus 10 to permit first and second sponges 42, 44 to be submerged in fluid 52 and pressed against first and second compartment panels 20, 24. This enables first sponge 42 to soak the cleaning fluid and second sponge 44 to soak the rinsing fluid. In this position, dividing wall 16 of washing system 10 extends within center slot 46 of sponge assembly 40.

As depicted in FIGS. 5-6, sponge assembly 40 is removed from first and second compartments 12, 14 and is passed through horizontally through first and second rollers 36, 38, and tray divider wall 34. As sponge assembly 40 slides through, first and second rollers 36, 38 rotate and squeeze first and second sponges 42, 44, thereby squeezing excess fluid 52 out of the sponges. In one embodiment, first and second rollers 36, 38 comprise a textured surface to assist the rollers in grabbing first and second sponges 42, 44 as they pass through.

As depicted in FIG. 8, return tray 32 is slanted and angled down toward first and second compartments 12, 14. This permits excess cleaning fluid from first sponge 42 to disperse on return tray 32 and travel back into first compartment 12. Similarly, excess rinsing fluid from second sponge 44 disperses on return tray 32 and travels back into second compartment 14. Tray divider wall 34 separates the flow of cleaning fluid and rinsing fluid back to the compartments. Since first vertical roller 36 is positioned a greater distance away from tray divider wall 34 compared to the distance between second vertical roller 38 and tray divider wall 34, first sponge 42 retains a greater amount of cleaning fluid than the amount of rinsing fluid retained in second sponge 44.

As depicted in FIG. 9, sponge assembly 40 is tilted and moved forward to apply fluid 52, specifically the cleaning fluid, to surface 54. As depicted in FIG. 10, sponge assembly 40 is tilted in the opposite direction and moved backward to squeeze out rinsing fluid and absorb the remaining fluid 52 on surface 54. This process of disposing sponge assembly 40 into washing system 10 to absorb fresh cleaning and rinsing fluid, passing first and second sponges 42, 44 through first and second rollers 36, 38 and tray divider wall 34 to remove excess fluid, and maneuvering sponge assembly 40 on surface 54 may be repeated any number of times as desired to adequately clean surface 54.

As depicted in FIGS. 11-12, alternate washing system 56 and alternate sponge assembly 80 are disclosed, which comprises components similar to washing system 10 and sponge assembly 40. Alternate washing system 56 comprises a housing 70 comprising alternate first compartment 58, alternate second compartment 60, alternate dividing wall 62, wall slots 64, first grate 66, second grate 68, first horizontal roller 76, second horizontal roller 78, alternate return tray 72, tray divider wall 74 and overhang 92. Alternate sponge assembly 80 comprises handle 88, upper flange 90, alternate first sponge 82, alternate second sponge 84, and center slot 86.

Alternate washing system 56 is operated in substantially the same manner as washing system 10. Alternate first compartment 58 stores a cleaning fluid and alternate second compartment 60 stores a rinsing fluid. Alternate sponge assembly 80 is disposed within alternate first and second compartments 58,60 and against first and second grates 66, 68 to absorb the cleaning fluid and rinsing fluid. Alternate sponge assembly 80 is passed through first and second horizontal rollers 76,78 with upper flange 90 passing under overhang 92, to squeeze excess cleaning fluid and rinsing fluid. Alternate sponge assembly 80 is then maneuvered along surface 54 for a cleaning as desired.

It shall be appreciated that the components of the washing system described in several embodiments herein may comprise any alternative known materials in the field and be of any color, size and/or dimensions. It shall be appreciated that the components of the washing system described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:
1. A washing system for use to clean a surface with enhanced efficiency and reduced water usage, the washing system configured to apply a cleaning fluid and a rinsing fluid to the surface, the washing system comprising:
   a housing member comprising a first compartment and a second compartment separated by a dividing wall, the first compartment configured to store the cleaning fluid and the second compartment configured to store the rinsing fluid;
   a pair of rollers rotatably mounted to the housing member and positioned proximate the first and second compartments; and a sponge assembly detachably coupled to the housing member and comprising a first sponge and a second sponge, wherein the sponge assembly is configured to contact the housing member to permit the first sponge to soak the cleaning fluid in the first compartment and the second sponge to soak the rinsing fluid in the second compartment simultaneously;

wherein the sponge assembly is maneuvered to simultaneously permit the first sponge to contact the first roller and dividing wall to remove excess cleaning fluid stored therein and the second sponge to contact the second roller and dividing wall to remove excess rinsing fluid stored therein.

2. The washing system of claim 1, further comprising a first panel coupled to the first compartment and a second panel coupled to the second compartment, each panel of the first and second panels comprising a plurality of slots, wherein the first and second sponges are configured to contact the first and second panels when soaking the cleaning fluid and rinsing fluid.

3. The washing system of claim 2, wherein a first distance between the first roller and the dividing wall is greater than a second distance between the second roller and the dividing wall.

4. The washing system of claim 3, further comprising a slanted tray coupled to the housing member, the slanted tray configured to permit the removed excess cleaning fluid to return to the first compartment and the removed excess rinsing fluid to return to the second compartment.

5. The washing system of claim 4, wherein the sponge assembly comprises a pair of generally L-shaped members coupled together and separated by a distance to create a central slot, wherein the first L-shape member is configured to receive the first sponge thereto and the second L-shape member is configured to receive the second sponge thereto.

6. The washing system of claim 5, wherein the sponge assembly further comprises a handle coupled to the pair of generally L-shaped members.

7. The washing system of claim 6, wherein the central slot of the sponge assembly is configured to receive the dividing wall of the housing member when the sponge assembly is disposed within the first and second compartments.

8. The washing system of claim 7, wherein the dividing wall comprises a lower dividing wall member situated between the first and second compartments and an upper dividing wall member situated between the first and second rollers.

9. The washing system of claim 8, wherein the lower dividing wall member comprises a plurality of slots situated above the first and second panels.

10. The washing system of claim 9, wherein the pair of rollers are oriented generally upright.

* * * * *